United States Patent [19]

Yamase et al.

[11] Patent Number: 5,284,717
[45] Date of Patent: Feb. 8, 1994

[54] METHOD FOR PRODUCING RAW MATERIALS FOR A REFORMER BY CRACKING AND DESULFURIZING PETROLEUM FUELS

[75] Inventors: Osamu Yamase; Tadayuki Miura; Hajime Kubota, all of Tokyo, Japan

[73] Assignees: Petroleum Energy Center, Japan; Showa Shell Sekiyu Kabushiki Kaisha, Japan

[21] Appl. No.: 22,857

[22] Filed: Feb. 25, 1993

Related U.S. Application Data

[63] Continuation of Ser. No. 634,571, Dec. 27, 1990, abandoned.

[30] Foreign Application Priority Data

Dec. 27, 1989 [JP] Japan ................................. 1-336485

[51] Int. Cl.$^5$ ............................................. H01M 8/04
[52] U.S. Cl. .................................... 429/17; 429/19; 208/119; 208/120
[58] Field of Search .................. 208/119, 120; 429/17, 429/19

[56] References Cited

U.S. PATENT DOCUMENTS

| | | | |
|---|---|---|---|
| 3,485,746 | 12/1969 | Setzer et al. ........................ | 208/244 |
| 3,644,200 | 2/1972 | Young ................................. | 208/120 |
| 4,151,119 | 4/1979 | Gladrow . | |
| 4,336,130 | 6/1982 | Miller et al. . | |
| 4,429,053 | 1/1984 | Ward ................................... | 208/120 |
| 4,437,978 | 3/1984 | Chester et al. ...................... | 208/120 |
| 4,439,310 | 3/1984 | Audeh et al. ....................... | 208/120 |
| 4,522,894 | 6/1985 | Hwang et al. ...................... | 429/19 |
| 4,816,353 | 3/1989 | Wertheim et al. . | |
| 4,946,750 | 8/1990 | Nomden et al. .................... | 429/19 |

FOREIGN PATENT DOCUMENTS

1503018 11/1967 France .
1555766 1/1969 France .

OTHER PUBLICATIONS

Chemical Abstracts - vol. 105, No. 26, Abstract No. 229974E, p. 190 (Dec., 1986).
Chemical Abstracts - vol. 111, No. 22, Abstract No. 198541D (Nov., 1989).
Chemical Abstracts - vol. 110, No. 18, Abstract No. 157163T (May, 1989).
McCandless, Separation of Binary Mixtures of CO and H2 . . ., Ind. Eng. Chem. Process Des. Develop. 11:470 (1972).
Patent Abstracts of Japan-vol. 12, No. 252 (c-512) [3099] Jul. 15, 1988.
Patent Abstracts of Japan-vol. 12, No. 242 (c-510) [1089] Jul. 8, 1988.

*Primary Examiner*—David Brunsman
*Attorney, Agent, or Firm*—Cushman, Darby & Cushman

[57] ABSTRACT

The present invention provides a method for producing raw materials for a reformer by cracking and desulfurizing petroleum fuels, characterized by cracking and desulfurizing petroleum fuels in a desulfurizer in the fuel cell electricity generation process at a temperature of 300°-600° C., preferably 350°-500° C., a pressure of 1-10 kg/cm$^2$, an H$_2$/oil of 500-2000, preferably 800-1000, and an SV of 0.5-4 hr$^{-1}$ using a zeolite catalyst such as Y-type zeolite or a metallosilicate catalyst such as one having an Si/Me atomic ratio of 40-3200 where Me is Al, Ni, Co, Mo, W, Fe, Cr or Ga.

6 Claims, 3 Drawing Sheets

METHOD FOR PRODUCING RAW MATERIALS FOR A REFORMER BY CRACKING AND DESULFURIZING PETROLEUM FUELS

This is a continuation of application Ser. No. 07/634,571, filed on Dec. 27, 1990, which was abandoned upon the filing hereof.

The present invention related to an improvement in a desulfurization step in a fuel cell electricity generation process which uses petroleum products as raw material fuels and aims at diversification of source fuels.

Fuel cell electricity generation process is one type of future the fuel cell type energy conversion techniques which have many features such as energy savings and less environmental pollution. Fuels for fuel cells are produced mainly from natural gas and methanol, but can also be produced from liquid fuels such as petroleum. However, according to steam reforming method, up to butane fraction can be practically obtained in large-scale plant, but this is still insufficient from a standpoint of the fuel cell electricity generation process which uses petroleums.

A representative flow sheet of electricity generation process by fuel cells using petroleums is shown in FIGS. 1 and 2.

In combination of desulfurizer and reformer in the above process, load of catalyst for the reformer increases with the raw materials becoming heavier. Therefore, load for reforming catalyst is reduced by allowing catalyst in desulfurizer to have cracking function, and thus, raw material fuels can be diversified.

The present invention relates to a method for obtaining raw materials for the reformer by cracking and desulfurizing petroleum fuels, characterized by cracking and desulfurizing petroleum fuels in a desulfurizer in the electricity generation process by fuel cell at a temperature of 300°–600° C., preferably 350°–500° C., a pressure of 1–10 kg/cm$^2$, an H$_2$/oil ratio of 500–2000, preferably 800–1000, and an SV of 0.5–4 hr$^{-1}$ using a zeolite catalyst such as Y-type zeolite or matallosilicate catalyst (Si/Me atomic ratio: 40–3200, where Me is Al, Ni, Co, Mo, W, Fe, Cr or Ga).

BRIEF DESCRIPTION OF THE DRAWINGS

In FIGS. 1 and 2 which are flow sheets of fuel cell electricity generation processes to which the present invention is applied, the reference numbers indicate the following:

1: desulfurizer, 2: adsorber, 3: reformer provided with a furnace, 4: shift converter (4-A: low-temperature shift converter, 4-B: high-temperature shift converter, 5: fuel cell, 6: seperation membrane.

Kerosene, naphtha, LPG, and the like are used as raw material fuels for fuel cells.

In the desulfurizer, Y-type zeolite or metallosilicate catalyst (Si/Me atomic ratio: 40-3200, where Me is Al, Ni, Co, Mo, W, Fe, Cr or Ga) is used as desulfurizing catalyst having cracking function.

Reaction conditions in desulfurizer are selected so that sulfur content in product is at most 1 ppm taking into consideration the poisoning of reforming catalyst and cracking rate of the raw material fuel is 10–70%.

Cracking rate here means a proportion of components in the product lighter than raw material. In the adsorber, sulfur contained in the raw material fuel is removed in the form of hydrogren sulfide.

In the reformer, the raw material are converted to a product-gas comprising hydrogen as main component and CO and CO$_2$ in accordance with the following reaction formula.

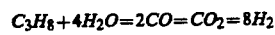

Catalysts used are commercially available noble metal or nickel-supporting alumina catalysts.

Composition-range of raw material which can be applied to reformer is specific gravity: 0.5–0.85, components: C$_3$–C$_{20}$ hydrocarbons.

Conditions in the reformer are temperature: 700°–800° C.; pressure: 10 kg/cm$^2$ or less; H$_2$O/C (molar ratio): at least 2; and SV: 0.5–4.0 hr$^{-1}$.

Compositions of the product-gas in the reformer is typically H$_2$ 65–80 vol%, CO 5–20 vol%, and CO$_2$ 5–25 vol%, but this is may vary depending on operation-conditions.

The upper and lower limit of the above ranges are determined by changing operation-conditions of reformer, but operation-conditions by which content of H$_2$ is close to the upper limit are preferred.

One example of composition of product-gas from the reformer when kerosene, naphtha and LPG are used as raw material is shown in Table 1.

TABLE 1

| Gas | Raw material kerosene (vol %) | Raw material naphtha (vol %) | Raw material LPG (vol %) |
| --- | --- | --- | --- |
| H | 72.0 | 73.9 | 74.2 |
| CO | 10.8 | 10.0 | 9.7 |
| CO$_2$ | 17.2 | 16.1 | 16.1 |

In shift converter, reaction is carried out in the presence of H$_2$O according to the following reaction formula.

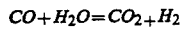

In the shift converter, Fe-based catalysts and Cu-based catalysts are used and there are the two reactions of high-temperature shift reaction and low-temperature shift reaction depending on catalyst used.

The high-temperature shift reaction is carried out at a temperature of 330° C. or higher and a pressure of 1–35 kg/cm$^2$ and the low-temperature shift reaction is carried out at a temperature of 190°–370° C. and at a pressure of 1–30 kg/cm$^2$.

Generally, both high-temperature shift converter and low-temperature shift converter are necessary for reducing the CO concentration in converted gas to 1 vol% or less.

Figure 1:
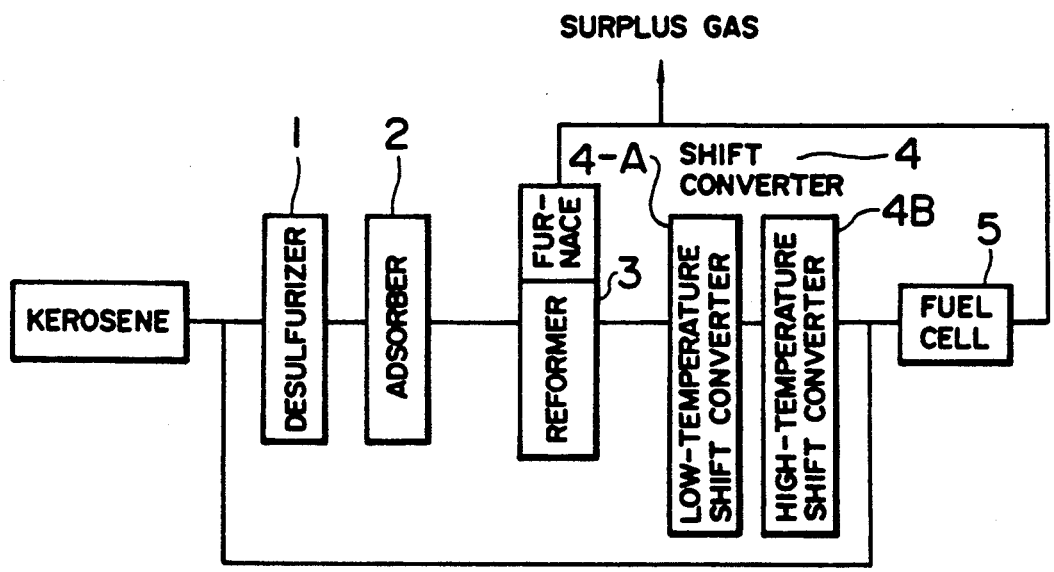
FIG. 1 is a flow sheet of a fuel cell process.
Figure 2:
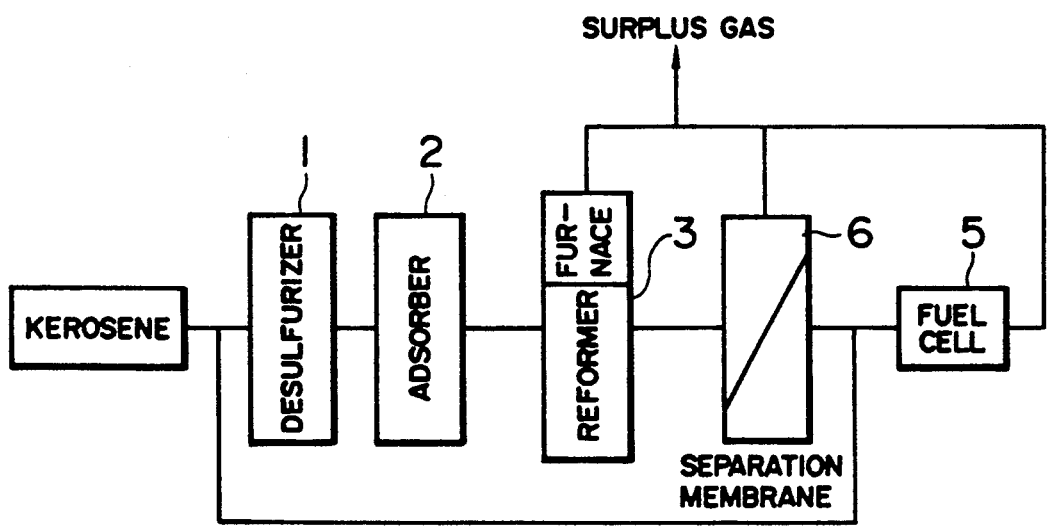
FIG. 2 is another flow sheet of a fuel cell process.

In the fuel cell electricity generation process as shown in FIG. 2, a polyimide type gas separation membrane is used in place of shift converter. In this case, reformed gas is treated under the conditions of temperature 50°–150° C. and pressure 2–10 kg/cm$^2$ and CO in the reformed gas is mostly separated and removed.

EXAMPLE

The following five metallosilicate catalysts were used as cracking and desulfurizing catalysts.
Catalyst A: Al-silicate (Si/Al=40)
Catalyst B: Ni-silicate (Si/Ni=40)
Catalyst C: Co ion exchanged type Al-silicate (Si/Al=40)
Catalyst D: Al-silicate (Si/Al=3200)
Catalyst E: Fe-silicate (Si/Fe=3200)
Properties of the above catalysts are shown in Table 2.

TABLE 2

| Catalyst | A | B | C | D | E |
|---|---|---|---|---|---|
| Surface area (m²/g) | 382.9 | 352.8 | 315.6 | 309.9 | 372.3 |
| Pore volume (ml/g) | 0.29 | 0.20 | 0.28 | 0.18 | 0.26 |

Figure 3:
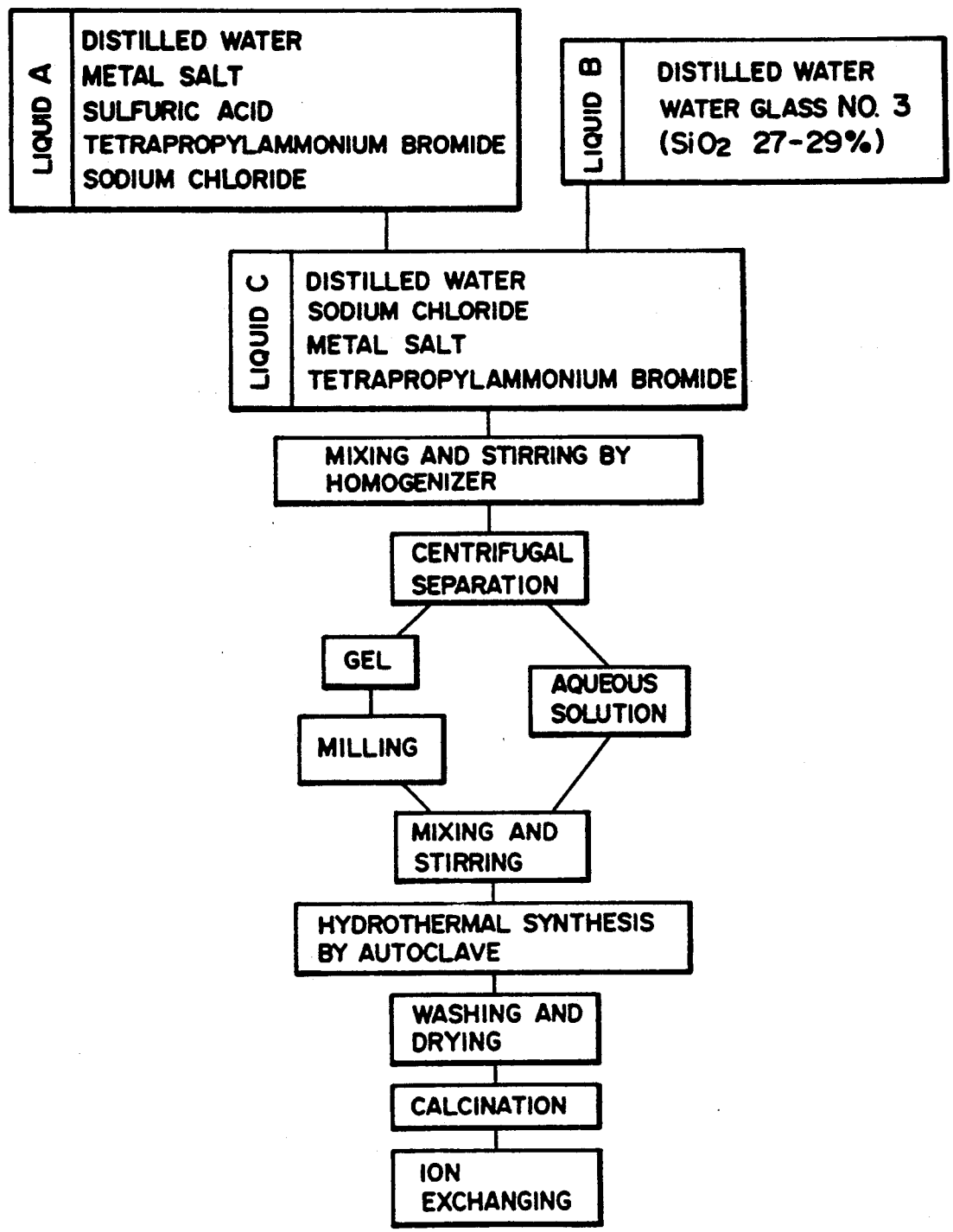
FIG. 3 is a flow sheet of preparation of metallosilicate catalyst of the present invention.

Preparation method of metallosilicate catalyst is shown in FIG. 3. Hydrothermal synthesis of metallosilicate catalyst was carried out in an autoclave using water-soluble salts of active metals such as sulfate, nitrate and chloride at 100°-250° C., drying was carried out at 120° C. for 4 hours, and calcination was carried out at 540° C. for 3.5 hours. Then, sodium ion of the metallosilicate was ion exchanged with ammonium ion and the metallosilicate was dried and calcined at 540° C. and then was used.

Desufurization reaction was carried out using a pressure flowing type reactor with a reaction tube made of SUS316 and having an inner diameter of 16 mm and a length of 660 mm.

120 ml of the catalyst (8–16 meshes) was packed and 70 ml thereof, i.e., from the center of the upper electric furnace to the center of the lower electric furnace was made as effective catalyst packing amount.

Kerosene and naphtha were used as raw materials for desulfurization. For kerosene, reaction was carried out under the conditions of pressure 6 kg/cm², SV 1 hr$^{-1}$ and H$_2$/oil ratio 1000 at temperatures of 400° C. and 500° C.

The results for liquid product are shown in Table 3 on kerosene and in Table 5 on naphtha. Furthermore, results on the whole products including gas component for kerosene are shown in Table 4.

Analysis of cracking products (liquid component) of keresene and naphtha was carried out using SHIMADZU GC-9A (column CBP.1-M50) and analysis of cracking products (gas component) was carried out using SHIMADZU GC-9A (column: sebaconitrile).

TABLE 3

| | Reaction tempera-ture (°C.) | Composition of product | | |
|---|---|---|---|---|
| | | C$_9$ and lower (wt %) | C$_{10-12}$ (wt %) | C$_{13}$ and higher (wt %) |
| Raw material kerosene | — | 5.9 | 55.1 | 39.0 |
| Catalyst A | 400 | 35.4 | 35.5 | 29.1 |
| Catalyst A | 500 | 56.6 | 28.8 | 14.6 |
| Catalyst B | 400 | 22.6 | 42.2 | 35.2 |

TABLE 4

| | Reaction tempera-ture (°C.) | Composition of product | | |
|---|---|---|---|---|
| | | C$_5$ and lower (wt %) | C$_{6-9}$ (wt %) | C$_{10}$ and higher (wt %) |
| Raw material kerosene | — | 0 | 5.9 | 94.1 |
| Catalyst A | 400 | 29.4 | 27.9 | 42.7 |
| Catalyst A | 500 | 36.9 | 25.8 | 37.3 |

TABLE 5

| | Reaction conditions | | | Reaction products (wt %) | | | |
|---|---|---|---|---|---|---|---|
| Catalyst | Temp. (°C.) | SV (hr$^{-1}$) | Pressure (kg/cm²) | C$_6$ and lower | C$_7$–C$_9$ | C$_{10}$ and higher | Aromatics (BTX) |
| Raw material naphtha | | | | 0.4 | 74.3 | 10.5 | 14.8 |
| A | 400 | 0.8 | 6 | 61.4 | 13.2 | 5.9 | 19.5 |
| A | 500 | 0.8 | 6 | 58.3 | 8.5 | 6.1 | 27.1 |
| A | 500 | 1.3 | 25 | 48.1 | 6.7 | 6.4 | 38.8 |
| A | 400 | 1.9 | 6 | 55.2 | 12.3 | 9.5 | 23.0 |
| D | 500 | 2.0 | 6 | 53.7 | 24.0 | 5.7 | 16.6 |
| D | 500 | 0.9 | 6 | 56.1 | 21.9 | 6.8 | 15.2 |
| E | 500 | 1.9 | 6 | 54.4 | 22.3 | 6.2 | 17.1 |
| E | 500 | 0.9 | 6 | 46.7 | 24.1 | 9.2 | 20.0 |

Figure 4:
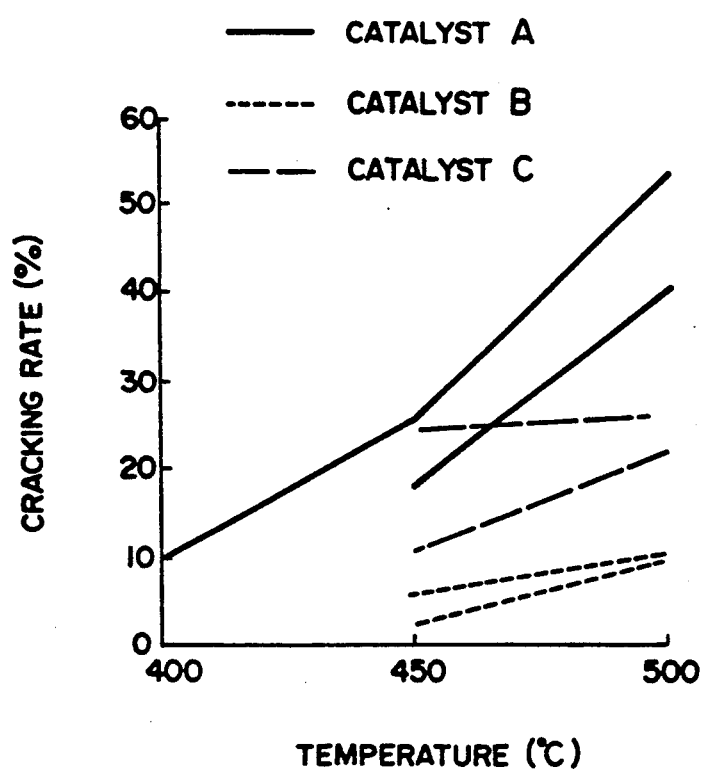
FIG. 4 is a graph which shows relation between reaction temperature of the present invention and cracking rate.

Furthermore, for kerosene, relation between reaction temperature and cracking rate was examined at temperatures of 400° C., 450° C., and 500° C., a pressure of 6 kg/cm², an SV of 1 hr$^{-1}$ and an H$_2$/oil ratio of 1000 and the results are shown in FIG. 4.

As can be seen from Tables 3–5 and FIG. 4, cracking rate reached 50% or higher in the case of catalysts A–E. With increase of reaction temperature and pressure, aromatic components increased. Aromatic components are apt to reduce activity of catalyst due to deposition of carbon on catalyst. So, production of aromatic components must be lowered.

Y-type zeolite, Mo-silicate, W-silicate, Cr-silicate and Ga-silicate catalysts also showed the cracking activity for kerosene similar to that of catalyst B.

As explained above, according to the present invention, cracking and desulfurizing catalysts having a cracking rate of 50% or higher for kerosene and naphtha have been able to be developed.

When kerosene (sulfur content 25 ppm) was used as raw material oil and cracking was conducted using catalyst A at a reaction temperature of 500° C., fractions of C$_9$ and lower in the product reached 60% or higher with sulfur content of less than 0.1 ppm, and fractions of C$_{12}$ and lower reached 85%. Amount of aromatics produced was small.

We claim:
1. A method for producing raw materials for a steam reformer in a fuel cell electricity generation process which comprises:
providing in combination, a desulfurzier, an adsorber; a steam reformer, a converter or gas separation membrane, and a fuel cell, and desulfurizing and cracking petroleum fuel in the desulfurizer using a metallosilicate catalyst having a Si/Al atomic ratio of 40-3200 at a temperature of 300°-600° C., a pressure of 1-10 kg/cm$^2$, H$_2$/oil ratio of 500-2000, and an SV of 0.5-4 hr$^{-1}$.

wherein in said steam reformer, said desulfurzied and cracked fuel reacts with steam and is converted to product-gas comprising hydrogen, carbon monoxide, and carbon dioxide.

2. A method according to claim 1, wherein the catalyst in said desulfurizing step is a metallosilicate catalyst has in atomic ratio Si/Me of 40-3200 wherein Me is metal selected from a group consisting of Al, Ni, Co, Mo, W, Fe, Cr and Ga.

3. A method according to claim 1, wherein the petroleum fuel is kerosene, naphtha or liquified petroleum gas.

4. A method according to claim 1, wherein the composition range of the desulfurized and cracked fuel fed into the reformed is C$_3$ to C$_{20}$ hydrocarbon and has a specific gravity of 0.5 to 0.85.

5. A method according to claim 1, wherein said cracking and desulfurizing is conducted at 350°-500° C. and an H$_2$/oil ratio of 800-1000.

6. A method for producing raw materials from a steam reformer in a fuel cell electricity generation process which comprises:

providing, in combination, a desulfurizer, an adsorber, a steam reformer, a converter or gas separation membrane, and a fuel cell, desulfurizing and cracking fuel comprising kerosene, naphtha or liquified petroleum gas in said desulfurizer in the presence of a metallosilicate catalyst having an atomic ratio Si/Me of 40-3200, wherein Me is a metal selected from the group consisting of Al, Ni, Co, Mo, W, Fe, Cr and Ga, at a temperature of 300°-600° C., a a pressure of 1-10 kg/cm$^2$, a H$_2$/oil ratio of 500-2000, and an SV of 0.5-4 hr$^{-1}$ whereby the desulfurized product contains $\leq$ 1 ppm sulfur, introducing said desulfurized product into said reformer wherein said product comprises C$_3$ to C$_{20}$ hydrocarbon and has a specific gravity of 0.5 to 0.85, steam reforming said product in said steam reformer wherein said product reacts with steam and is converted to product-gas comprising hydrogen, carbon monoxide, and carbon dioxide, and reducing the carbon monoxide content of the product-gas from said steam reformer to $\leq$ 1 vol. %.

* * * * *